UNITED STATES PATENT OFFICE.

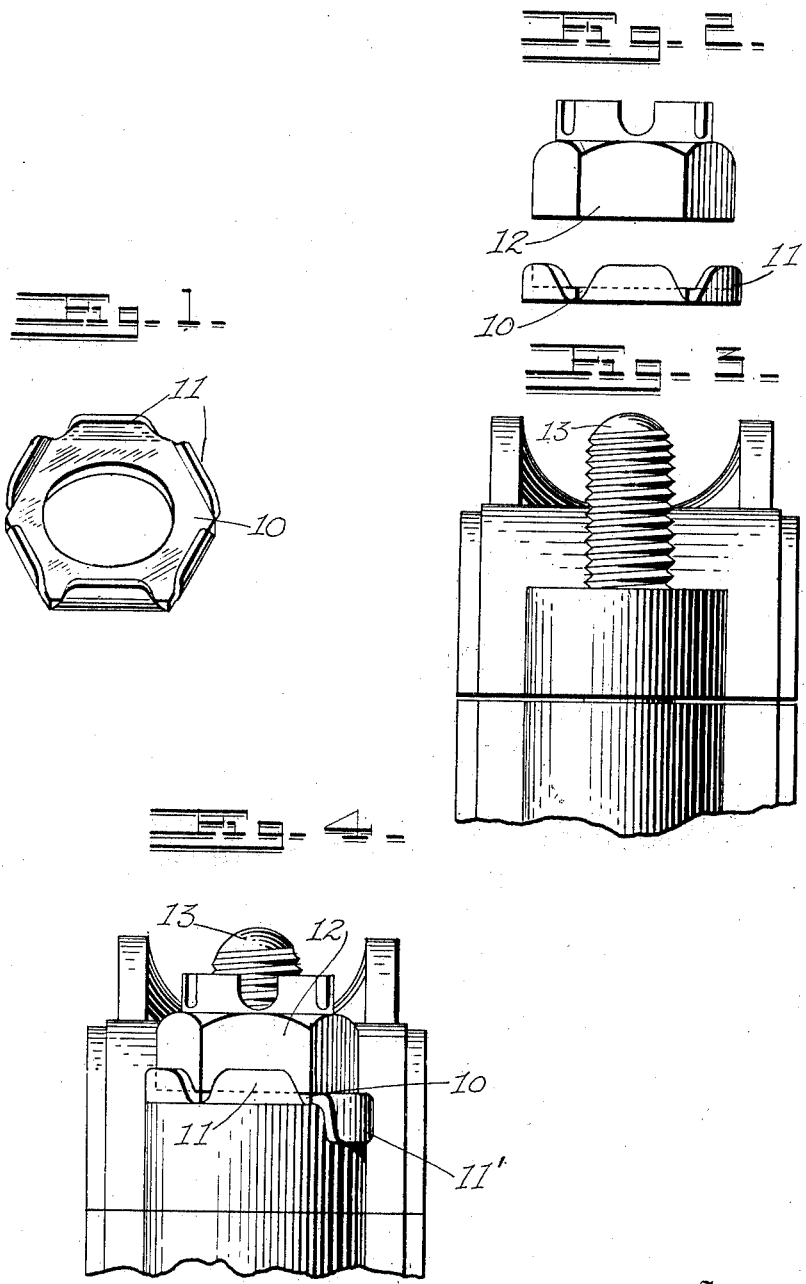

WILLIAM N. LOVING, OF HIGHLAND PARK, MICHIGAN.

NUT-LOCK.

1,372,178.   Specification of Letters Patent.   Patented Mar. 22, 1921.

Application filed September 12, 1919. Serial No. 323,269.

*To all whom it may concern:*

Be it known that I, WILLIAM N. LOVING, a citizen of the United States, residing at Highland Park, in the county of Wayne and State of Michigan, have invented certain new and useful Improvements in Nut-Locks, of which the following is a specification.

This invention relates to nut-locks and has for an object to provide a washer adapted to fit the base of a nut and to be placed upon the screw or bolt with the nut and provided with means for bending out of engagement with the nut and into engagement with some fixed adjacent abutment whereby the washer and nut embraced thereby are securely locked against rotation.

Referring to the accompanying drawings which form a part hereof, and on which similar reference characters indicate similar parts, Figure 1 is a perspective view of the washer, Fig. 2 is a view in side elevation of a conventional nut and the washer removed therefrom but in position to be engaged thereby, Fig. 3 is a view in elevation of a conventional article to receive the combined nut and washer, and Fig. 4 is a view in elevation of the nut and washer in place with one of the tongues bent into locking position.

The improved nut-lock which forms the subject matter of this application comprises essentially a washer 10 having its periphery bent up at various points, as indicated at 11, to embrace the base of a nut 12.

Preferably, though not necessarily, the washer will be constructed from a blank having the tongues 11 separated each from the other by an indentation in the periphery, although it is to be understood that for use with nuts of some shapes a circular blank may be employed and the peripheries turned by stamping to the required embracing proportions. The requirements are that the several up-turned portions shall embrace the base of the nut so that when the nut is placed upon the bolt 13 the washer will rotate with the nut until the nut has been screwed home. When this has been completed anyone of the several tongues 11 may be bent from their upstanding position as found in the article of manufacture into engagement with any stationary or fixed abutment adjacent to the bolt. As shown at Fig. 4 one of the tongues has been bent downwardly at 11' into engagement with the side of the structure, which is here shown as a piston rod.

With the device constructed as an article of manufacture in the form shown at Fig. 1 with the tongues upstanding to fit and embrace the base of the nut, it is obvious that only the most rudimentary tools will be required to bend down the required tongue, such implement being a hammer, a screw-driver, or a cold-chisel. While the article of manufacture, as shown at Fig. 1, is proportioned to fit the base of a hexagonal nut, it is to be understood that the number of sides and the number of tongues depends wholly upon the shape of the nut to which it is to be applied.

Having thus fully described my said invention, what I claim as new and desire to secure by Letters Patent, is:

1. The combination with a nut of a washer composed of sheet material having identical peripheral tongues bent up about and embracing the base of the nut and selectively bendable from such embracing position completely backwardly upon themselves into engagement with the body beneath the nut.

2. The combination with a nut adapted to be seated on a cylindrical member of a washer interposed between the nut and seat and composed of sheet material having identical peripheral tongues bent up about and embracing the base of the nut and selectively bendable from such embracing position completely backwardly upon themselves into engagement with the surface of the cylindrical seating member.

In witness whereof, I have hereunto set my hand and seal at Highland Park, Michigan, this 16th day of August, A. D. nineteen hundred and nineteen.

WILLIAM N. LOVING. [L. S.]

Witnesses:
JAMES E. LOVING,
EUGENE D. GERARD.